United States Patent [19]

Wasko

[11] 3,871,941

[45] Mar. 18, 1975

[54] APPARATUS USED IN BONDING A PRECURED TREAD ON A TIRE CASING

[75] Inventor: Elmer J. Wasko, Wadsworth, Ohio

[73] Assignee: The Goodyear Tire & Rubber Company, Akron, Ohio

[22] Filed: Feb. 14, 1972

[21] Appl. No.: 225,781

[52] U.S. Cl. ............... 156/394, 156/96, 264/36, 264/315, 264/316, 425/19, 425/39, 425/43, 425/45
[51] Int. Cl. ............................................. B29h 5/04
[58] Field of Search ............... 156/394 FM, 394, 96; 264/36, 315, 316; 425/19, 39, 43, 45

[56] References Cited
UNITED STATES PATENTS

| 1,483,857 | 2/1924 | Fitzharris | 156/394 FM |
|---|---|---|---|
| 2,014,010 | 9/1935 | Wheatley | 156/127 X |
| 2,434,156 | 1/1948 | Heintz | 156/96 |
| 2,459,757 | 1/1949 | Smith | 156/96 |
| 2,468,121 | 4/1949 | Shell | 156/394 FM |
| 2,793,397 | 5/1957 | Barefoot | 425/19 |
| 2,866,228 | 12/1958 | French | 425/19 |
| 3,676,028 | 7/1972 | Christie | 425/43 |
| 3,745,084 | 7/1973 | Schelkmann | 156/394 FM |
| 3,779,830 | 12/1973 | Reppel | 156/96 |
| 3,779,831 | 12/1973 | Reppel | 156/96 |
| 3,779,832 | 12/1973 | Reppel | 156/96 |
| 3,779,833 | 12/1973 | Reppel | 156/96 |
| R15,120 | 6/1921 | Pfeiffer | 156/394 FM |

FOREIGN PATENTS OR APPLICATIONS

| 1,026,724 | 4/1966 | Great Britain | 156/414 |
| 555,680 | 9/1943 | Great Britain | 156/96 |

Primary Examiner—Clifton B. Cosby
Attorney, Agent, or Firm—F. W. Brunner; H. E. Hummer

[57] ABSTRACT

A mold-type apparatus used in retreading a tire casing with a precured tread. The apparatus is composed of two halves or sections which carry rubber curing bags. The bags are inflated with steam and used to press the precured tread firmly against the tire casing while heating and curing the gum rubber and adhesive normally used between the precured tread and the tire casing.

24 Claims, 2 Drawing Figures

3,871,941

APPARATUS USED IN BONDING A PRECURED TREAD ON A TIRE CASING

BACKGROUND OF THE INVENTION

The invention is well suited for use in retreading tires with precured treads, especially retreading non-deflatable tires filled with foamed rubber, because such tires cannot be demounted from the rims and conventional retreading molds are not built to accommodate a tire and rim assembly.

Some methods, presently employed for retreading a tire with a previously vulcanized or precured tread, utilize a complex rubber cover and wheel rim assembly for sealing the tire from steam, hot air, or hot water, which are the conventional mediums for heating and curing the combination of gum rubber and adhesive generally used for bonding the precured tread to the tire casing. Such methods are usually very cumbersome and time-consuming because of the techniques involved in sealing the tire from the heated medium. An improved and much simplified method is described in my copending application, Ser. No. 198,280, filed Nov. 12, 1971 now U.S. Pat. No. 3,802,977 of Apr. 8, 1974. The invention is directed to providing a mold-like apparatus which greatly simplifies practicing the general method described in this copending application.

SUMMARY OF INVENTION

Briefly stated, the invention is in a mold-like apparatus for receiving a retread tire assembly, including a tire casing and a previously molded and vulcanized tread which is tacked to buffed periphery of the tire casing by any suitable cement or adhesive.

The apparatus comprises a pair of sections movable relative to each other and, when closed, contacting each other and forming a cavity for receiving the tire assembly. A pair of annular stops project from the sections into the cavity and terminate in at least close proximity to the sidewalls of a tire casing in the cavity. A pair of separate, non-communicating, expansible, annular chambers for receiving steam, are provided in the sections adjacent the stops. A pair of flexible diaphragms are supplied for sealing the chambers adjacent a tire casing positioned in the apparatus. The diaphragms are moved into engagement with the precured tread and adjacent annular portions of a tire casing in the apparatus, when the chambers are uniformly filled with steam.

DESCRIPTION OF THE DRAWING

The following description of the invention will be better understood by having reference to the annexed drawing, wherein.

ENVIRONMENT OF THE INVENTION

Figure 1:
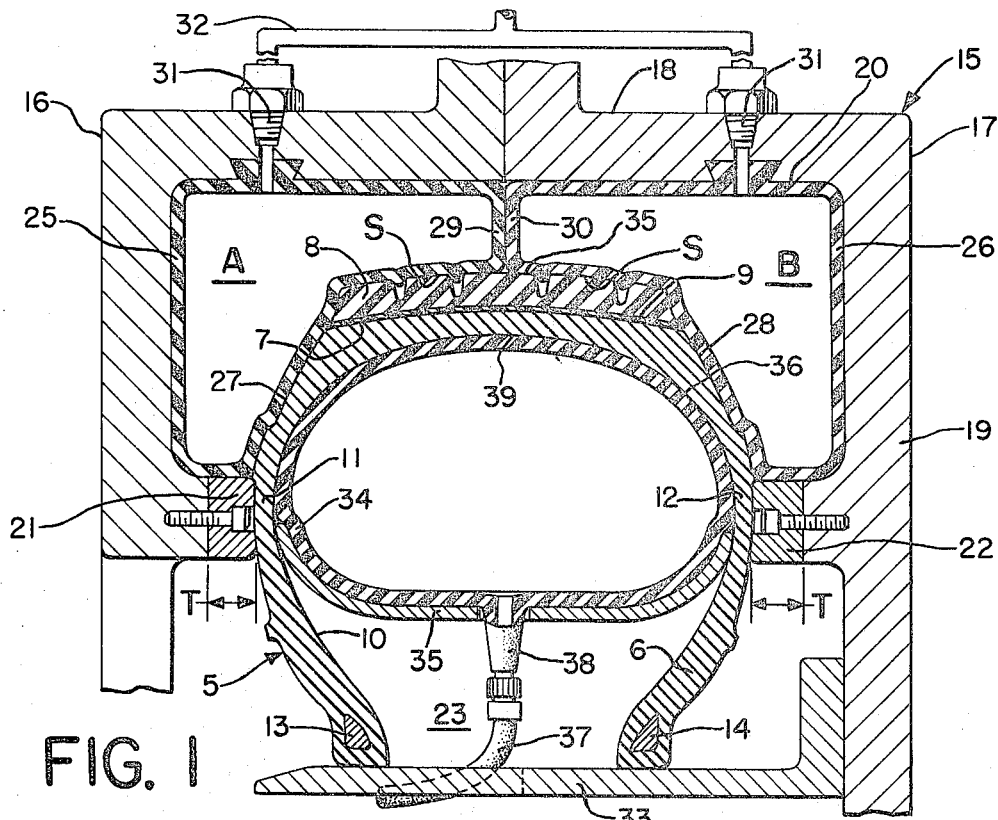
FIG. 1 is a cross-section of a retread tire assembly and apparatus made in accordance with the invention.

The method of retreading a tire described in my copending application essentially comprises the steps of: (1) buffing a worn or defective tread from a tire casing which includes such conventional components as carcass plies, beads, sidewalls, and any other reinforcements not a part of the worn or defective tread; (2) applying a suitable cement or adhesive to the outer buffed periphery of the tire casing and adjacent inner periphery of a precured tread which will be used in the retreading process; (3) placing an appropriate uncured gum rubber on the outer buffed periphery of the tire casing, or on the precured tread; (4) mounting the precured tread on the tire casing; (5) successively placing an inflatable curing tube and a standard curing rim within the cavity of the tire casing; (6) positioning an annular rubber curing bag around the precured tread; and (7) inflating the curing tube with air and the curing bag with steam to press the precured tread firmly against the tire casing while heating and curing the combination of gum rubber and adhesive.

The curing bag is specially configured to overlap the precured tread and contact adjacent portions of the sidewalls of the tire casing, such that the precured tread is completely engulfed by the curing bag to insure properly and uniformly heating the gum rubber and adhesive to perfect a good bond between the precured tread and tire casing. The curing bag, because of its particular configuration, is somewhat difficult to place around the precured tread and tire casing for subsequent disposal in a device in which the gum rubber and adhesive are heated and cured. It is believed that the following described apparatus will facilitate retreading tires using the general method briefly described above, and in greater detail in the aforementioned copending application.

Referring generally to the drawing, there is shown a retread tire assembly 5, including a tire casing 6 with an outer buffed periphery 7, a previously molded and vulcanized tread 8 disposed around the buffed periphery 7, and a combination of any suitable uncured gum rubber and adhesive, indicated at 9, as described in the copending application. The tire casing 6 essentially comprises a toroidally shaped carcass 10 provided with a pair of annular sidewalls 11 and 12 which extend from the precured tread 8 and terminate at a pair of annular beads 13 and 14. The retread tire assembly 5 is placed in a mold-like apparatus 15 in which the uncured gum rubber and adhesive 9 are heated and cured while the precured tread 8 is pressed firmly against the outer buffed periphery 7 of the tire casing 6.

THE INVENTION

The mold-like apparatus 15 comprises two halves or sections 16 and 17 which are generally similar in design. Each of the sections 16 and 17 comprises a cylindrical casing 18 extending from a solid closure plate 19. The apparatus 15 differs from conventional molds used in molding and curing tires in that the configured matrix rings normally employed for forming the ribs and grooves in the tread are replaced by the smooth inner peripheral surfaces 20 of the casings 18.

A pair of annular stops 21 and 22 are disposed on opposing closure plates 19 and project into a cavity 23 formed in the apparatus 15 for receiving the retread tire assembly 5. The stops 21 and 22 terminate in at least close proximity to the sidewalls 11 and 12 of the tire casing 6 and preferably contact the sidewalls 11 and 12 in closer spaced relation to the precured tread 8 than the annular beads 13 and 14. The stops 21 and 22 should not distort the toroidal configuration of the tire casing 6 during heating and curing of the gum rubber and adhesive 9; therefore, the annular rings or stops 21 and 22 are removable from the closure plates 19 for replacement with rings having suitable thicknesses T for accommodating different size tires. The stops 21 and 22, in effect, seal the space between the sections 16 and 17 and adjacent sidewalls 11 and 12 of the tire casing 6.

A pair of annular chambers A and B are disposed in the mold sections 16 and 17 adjacent the annular stops 21 and 22 and are preferably fluid impervious for receiving a heated curing medium such as steam. A pair of flexible diaphragms S are provided adjacent the tire casing 6 for sealing the steam chambers A and B. In practice, a pair of flexible curing bags 25 and 26, preferably composed of any suitable steam resistant rubber material, form the steam chambers A and B and flexible diaphragms S. The curing bags 25 and 26 are designed for covering the precured tread 8 and adjacent annular portions 27 and 28 of the sidewalls 11 and 12 of a tire casing 6 positioned within the cavity 23 of the apparatus 15. The annular stops 21 and 22 help confine inflation of the curing bags 25 and 26 in a direction for pressing the precured tread 8 firmly against the outer buffed periphery 7 of the tire casing 6. The adjacent portions 29 and 30 of the curing bags 25 and 26 are moved into tight sealing engagement as the bags are inflated with steam to insure complete coverage of the precured tread 8 and consequent proper heating and curing of the gum rubber and adhesive 9.

The curing bags 25 and 26 are provided with similar inlets 31 through which steam from a source of supply (not shown), is forced into the bags. An adapter 32 with a bifurcated end coupled to the steam inlets 31 is used for uniformly inflating the curing bags 25 and 26 with steam. Otherwise, the precured tread 8 may be moved by unequal steam pressures in the bags 25 and 26 to a distorted or undesirable position on the tire casing 6. Steam outlets, similar to the steam inlets, are supplied for exiting steam from the curing bags 25 and 26 and are preferably angularly disposed 180° apart from the steam inlets 31. Thus, new steam is constantly circulated through the curing bags 25 and 26 to insure proper heating and curing of the gum rubber and adhesive 9.

A plurality of centering posts, e.g. posts 33, are bolted to one of the closure plates 19 for engaging the annular beads 12 and 13 of the tire casing 6 to center the retread tire assembly 5 within the cavity 23 of the apparatus 15.

A standard curing tube 34 and curing rim 35 are placed standard the cavity 36 of the tire casing 6 shown in FIG. 1, prior to placing the retread tire assembly 5 in the apparatus 15. An air line from a source of supply (not shown) is connected to an air valve 38 of the curing tube 34 and air, under pressure, is pumped into the curing tube 34 for inflating the tube to exert outward pressure against the inner crown 39 of the tire casing 6. Thus, the precured tread 8 and tire casing 6 are pressed together as the curing tube 34 and curing bags 25 and 26 inflate.

Figure 2:
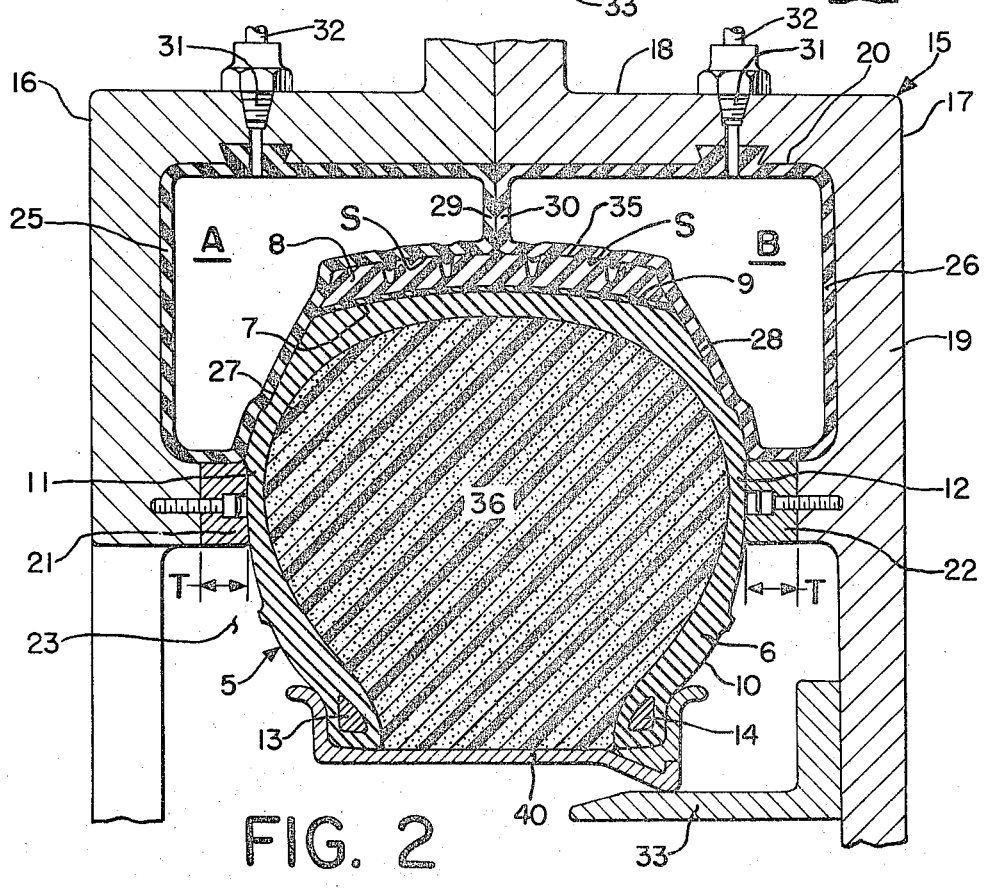
FIG. 2 is a cross-section of the apparatus showing a foam-inflated tire and rim assembly, also in cross-section, disposed within the apparatus.

The retread tire assembly 5 shown in FIG. 2 comprises a standary wheel rim 40 in addition to the components previously described. The tire casing 6 is mounted on the rim 40 and inflated with either air or foamed rubber. In either case, the assembly is placed within the cavity 23 of the apparatus 15 without demounting the tire casing 6 from the rim 40. There is no need for the curing tube 34 and curing rim 35, since the pressure exerted by the air or foamed rubber within the tire cavity 36, is sufficient to maintain the tire casing 6 in the proper toroidal shape.

The centering posts 33 of the apparatus 15 are positioned for engaging the wheel rim 40 to center it and the rest of the retread tire assembly 5 within the cavity 23 of the apparatus 15.

The two sections 16 and 17 may be moved into closed, contacting relation (FIGS. 1–2) by any suitable means. For example, the sections 16 and 17 can be hinged together for quick and easy closure of the apparatus 15.

Thus, there has been provided a mold-like apparatus which is especially suitable for retreading tires in accordance with the general process briefly outlined above and explained more fully in the aforementioned copending application.

What is claimed is:

1. A mold-like apparatus in which a tire casing with a precured tread is placed for heating and curing an adhesive for bonding the precured tread to the tire casing, comprising in combination:
   a. a pair of rigid sections movable relative to each other and, when closed in abutting relation, forming a cavity for receiving a tire casing with a precured tread, each of the sections including a closure plate secured to an outstanding cylindrical casing extending from the plate;
   b. a single, rigid, annular stop projecting from each of the sections into the cavity for substantially closing the space between the sections and adjacent sidewalls of a tire in said cavity, the stops being in radially spaced relation from the outstanding cylindrical casings to effect an annular seal with the sidewalls in spaced relation from the juncture of the precured tread and tire casing;
   c. a pair of separate, non-communicating, annular chambers for receiving steam, disposed in the sections between the cylindrical casings and stops;
   d. a pair of annular, flexible elastomeric diaphragms sealing the steam chambers from the tire cavity formed by the sections, the diaphragms designed to, (I) cover the precured tread and juncture and prevent steam from contacting the tread and juncture, and (II) compress the precured tread against the tire casing when the chambers are filled with steam sufficient to move the diaphragms into contact with the precured tread and juncture;
   e. means for uniformly filling the chambers with steam; and
   f. means for selectively, detachably mounting a plurality of stops with different thicknesses (T) on the closure plates.

2. The apparatus of claim 1, wherein the stops help restrict movement of the diaphragms into annular sealing engagement with each other and contact with at least the precured tread of a tire casing in said cavity.

3. The apparatus of claim 2, wherein the diaphragms are composed of rubber.

4. The apparatus of claim 3, which includes means for centering a tire casing in said cavity.

5. The apparatus of claim 4, which includes means for inflating a tire casing, positioned in said cavity, with gas under pressure.

6. The apparatus of claim 1, wherein a pair of annular, inflatable, steam-resistant curing bags are carried by the sections adjacent the stops and form the chambers and diaphragms.

7. The apparatus of claim 6, wherein the bags are designed for engaging and covering at least the precured tread of a tire casing in said cavity.

8. The apparatus of claim 7, wherein the stops are positioned for helping restrict inflation of the bags in the direction of a precured tread in said cavity.

9. The apparatus of claim 8, wherein the bags are composed of rubber material.

10. The apparatus of claim 9, which includes means for centering a tire casing in said cavity.

11. The apparatus of claim 10, wherein the tire casing centering means includes means for centering a tire casing mounted on a wheel rim in said cavity.

12. The apparatus of claim 11, which includes means for maintaining the tire casing in a suitable toroidal shape for properly bonding a precured tread on a tire casing.

13. The apparatus of claim 12, which includes means for equalizing the steam pressure within the curing bags.

14. A mold-like apparatus in which a tire casing with a precured tread is placed for heating and curing an adhesive for bonding the precured tread to the tire casing, comprising in combination:
   a. a pair of rigid sections movable relative to each other and, when closed in abutting relation, forming a cavity for receiving a tire with a precured tread, each of the sections including a closure plate secured to an outstanding cylindrical casing extending from the plate;
   b. a single, rigid, annular stop projecting from the closure plate of at least one of the sections into the cavity for closing the space between the section and adjacent sidewall of a tire in said cavity, the stop being in radially spaced relation from the outstanding cylindrical casing of the section carrying the stop to effect an annular seal with said sidewall in spaced relation from the juncture of the precured tread and tire casing;
   c. at least one annular heat chamber disposed between the stop and cylindrical casings for receiving a heated curing medium;
   d. at least one fluid impervious, flexible elastomeric diaphragm sealing the heat chamber from the tire cavity formed by the sections, the diaphragm designed to, (I) cover the tread, and juncture of the tread and casing of a tire in the cavity, and prevent the heated curing medium from contacting the tread and juncture, and (II) compress the precured tread against the tire casing when the heat chamber is filled with curing medium sufficient to move the diaphragm into contact with the tread and juncture between the tread and tire casing;
   e. means for filling the chamber with a heated curing medium; and
   f. means for selectively, detachably mounting a plurality of stops with different thicknesses (T) on the closure plate of said at least one section.

15. The apparatus of claim 14, wherein the chamber is formed by an annular rubber bag.

16. The apparatus of claim 15, wherein an annular stop and rubber bag are carried by each of the sections.

17. A mold-like apparatus in which a retreaded tire casing with vulcanizable material is placed for heating and vulcanizing said material, comprising in combination:
   a. a pair of single rigid sections movable relative to each other and, when closed in abutting relation, forming a cavity for receiving a tire, each of the sections including a closure plate secured to an outstanding cylindrical casing at the outer periphery of the plate, each of the outstanding cylindrical casings having a smooth inner periphery adjacent the tread of a tire in the cavity as distinguished from conventional matrix rings for molding a pattern of ribs and grooves in the tread of a tire;
   b. a rigid, annular stop projecting from the closure plate of at least one of the sections into the cavity for closing the space between the section from which the stop projects, and an adjacent sidewall of a tire positioned in the cavity, the stop being in radially spaced relation from the outstanding cylindrical casing of the section carrying the stop to effect an annular seal with the adjacent sidewall in radially spaced relation from the juncture of the tread and tire casing; and
   c. means for selectively, detachably mounting a plurality of stops with different thicknesses (T) on the closure plate of said at least one section carrying the stop.

18. The apparatus of claim 17, which includes a second annular stop projecting from the closure plate of the other section of said pair of sections, for closing the space between said other section and the adjacent sidewall of a tire casing positioned in said cavity, and means for selectively, detachably mounting a plurality of stops with different thicknesses (T) on the closure plate of said other section.

19. The apparatus of claim 18, wherein the stops are in aligned, parallel relation, when the sections are closed.

20. The apparatus of claim 17, which includes:
   e. at least one annular chamber formed in the cavity adjacent the tread on a tire positioned in the cavity when the sections are closed, said chamber designed for receiving a heated fluid; and
   f. at least one flexible elastomeric diaphragm for covering the tread and juncture of the tread and casing of a tire in the cavity and sealing said chamber to prevent heated fluid from contacting the thread and juncture.

21. The apparatus of claim 20, wherein said annular chamber and diaphragm are formed by an annular bag composed of rubber material.

22. The apparatus of claim 21, including means for filling the chamber with steam.

23. The apparatus of claim 21, which includes a second annular stop projecting from the closure plate of the other section of said pair of sections, and means for selectively, detachably mounting a plurality of stops with different thicknesses (T) on the closure plates of said sections such that the stops are in aligned, parallel relation when the sections are closed.

24. The apparatus of claim 23, wherein an annular bag, composed of rubber material is associated with each of said sections, and means are included for inflating each bag with steam.

* * * * *

UNITED STATES PATENT OFFICE
CERTIFICATE OF CORRECTION

PATENT NO. : 3,871,941
DATED : March 18, 1975
INVENTOR(S) : Elmer J. Wasko

It is certified that error appears in the above-identified patent and that said Letters Patent are hereby corrected as shown below:

Column 3, line 49, after "placed" the word "standard" should be -- within --;

line 61, "standary" should be -- standard --.

Signed and sealed this 15th day of July 1975.

(SEAL)
Attest:

RUTH C. MASON
Attesting Officer

C. MARSHALL DANN
Commissioner of Patents
and Trademarks